United States Patent
Goldman

(10) Patent No.: US 6,923,909 B2
(45) Date of Patent: Aug. 2, 2005

(54) DISC FILTER HOUSING AND FILTER DISC THEREOF

(75) Inventor: Sidney Goldman, Boca Raton, FL (US)

(73) Assignee: Sidney Goldman Revokable Trust, Boca Raton, FL (US)

( * ) Notice: Subject to any disclaimer, the term of this patent is extended or adjusted under 35 U.S.C. 154(b) by 24 days.

(21) Appl. No.: 10/303,155

(22) Filed: Nov. 25, 2002

(65) Prior Publication Data

US 2004/0099590 A1 May 27, 2004

(51) Int. Cl.$^7$ .......................... B01D 35/02; B01D 29/05
(52) U.S. Cl. .................... 210/232; 210/323.1; 210/335; 210/490; 210/492; 210/445; 210/450; 210/489; 210/446
(58) Field of Search ............................... 210/232, 323.1, 210/335, 450, 489, 490, 492, 445, 446

(56) References Cited

U.S. PATENT DOCUMENTS

| | | | | |
|---|---|---|---|---|
| 2,547,797 A | * | 4/1951 | Torrey et al. ............... | 210/445 |
| 3,004,671 A | * | 10/1961 | Sugalski et al. ............ | 210/445 |
| 3,295,684 A | * | 1/1967 | Webb .......................... | 210/314 |
| 3,421,631 A | * | 1/1969 | Hirsch ......................... | 210/445 |
| 3,592,768 A | * | 7/1971 | Parker ......................... | 210/495 |
| 3,966,439 A | * | 6/1976 | Vennos ..................... | 73/863.22 |
| 5,217,619 A | * | 6/1993 | Redmond et al. ........... | 210/650 |
| 5,545,242 A | * | 8/1996 | Whitlock et al. ............. | 55/502 |
| 5,792,434 A | * | 8/1998 | Ferlings et al. ............. | 422/275 |
| 5,853,587 A | * | 12/1998 | Young ......................... | 210/445 |
| 6,511,606 B2 | * | 1/2003 | Goldman ..................... | 210/767 |
| 2001/0035380 A1 | * | 11/2001 | Goldman ..................... | 210/739 |

* cited by examiner

*Primary Examiner*—Thomas M. Lithgow
(74) *Attorney, Agent, or Firm*—Martin Sachs, P.A.

(57) ABSTRACT

A variable compression disc filter housing secures a circumferentially welded composite layer of filter disc material for filtering a small amount of liquid for determining the optimum filter media material for specific production applications.

4 Claims, 4 Drawing Sheets

DISC FILTER HOUSING AND FILTER DISC THEREOF

BACKGROUND OF THE INVENTION

1. Field of the Invention

The present invention relates to collecting data to determine the optimum grade of filter media for specific applications, and more particularly, to filter a small amount of liquid to make a rapid determination as to the optimum filter media material to be use in production.

2. Discussion of the Relevant Art

The prior art discloses devices used in pressurized continuously operated air filter systems, such as for vacuum cleaners as disclosed in U.S. Pat. No. 5,651,811 issued to Frey et al. on Jul. 29, 1997, which utilize a plurality of filter media, as well as, a fiber filter with an electrically charged non-woven material for removing very fine air particles.

Another apparatus is disclosed in U.S. Pat. No. 5,076,933 issued to Glen et al. on Dec. 21, 1991, which utilizes coated filter membranes and absolute pore filters.

SUMMARY OF THE INVENTION

Therefore it is the primary object of the present invention to overcome the shortcomings of the prior art and provide an in-line filter to sample and filter the liquid to be filtered and enable the collection of data to determine the optimum grade of filter media for the specific production filtering requirements.

The foregoing and other objects and advantages will appear from the description to follow. In the description, reference is made to the accompanying drawing, which forms a part hereof, and in which, is shown by way of illustration, a specific construction in which the invention may be practiced. The apparatus will be described in sufficient detail to enable those skilled in the art to utilize the invention, and it is to be understood that other embodiments may be utilized and that structural changes may be made without departing from the scope of the invention. The following detailed method and description is, therefore, not to be taken in a Limiting sense, and the scope of the present invention is best defined by the appended claims.

The subject matter, which I regard as my invention, is particularly pointed out and distinctly claimed at the concluding portion of the specification. My invention, itself, as to its construction, together with further objects and advantages thereof, may best be understood by reference of the following description taken in connection with the accompanying drawing.

BRIEF DESCRIPTION OF THE DRAWINGS

In order that the invention may be more fully understood, it will now be described, by way of example, with reference to accompanying drawing in which.

DESCRIPTION OF THE PREFERRED EMBODIMENT

Figure 1:
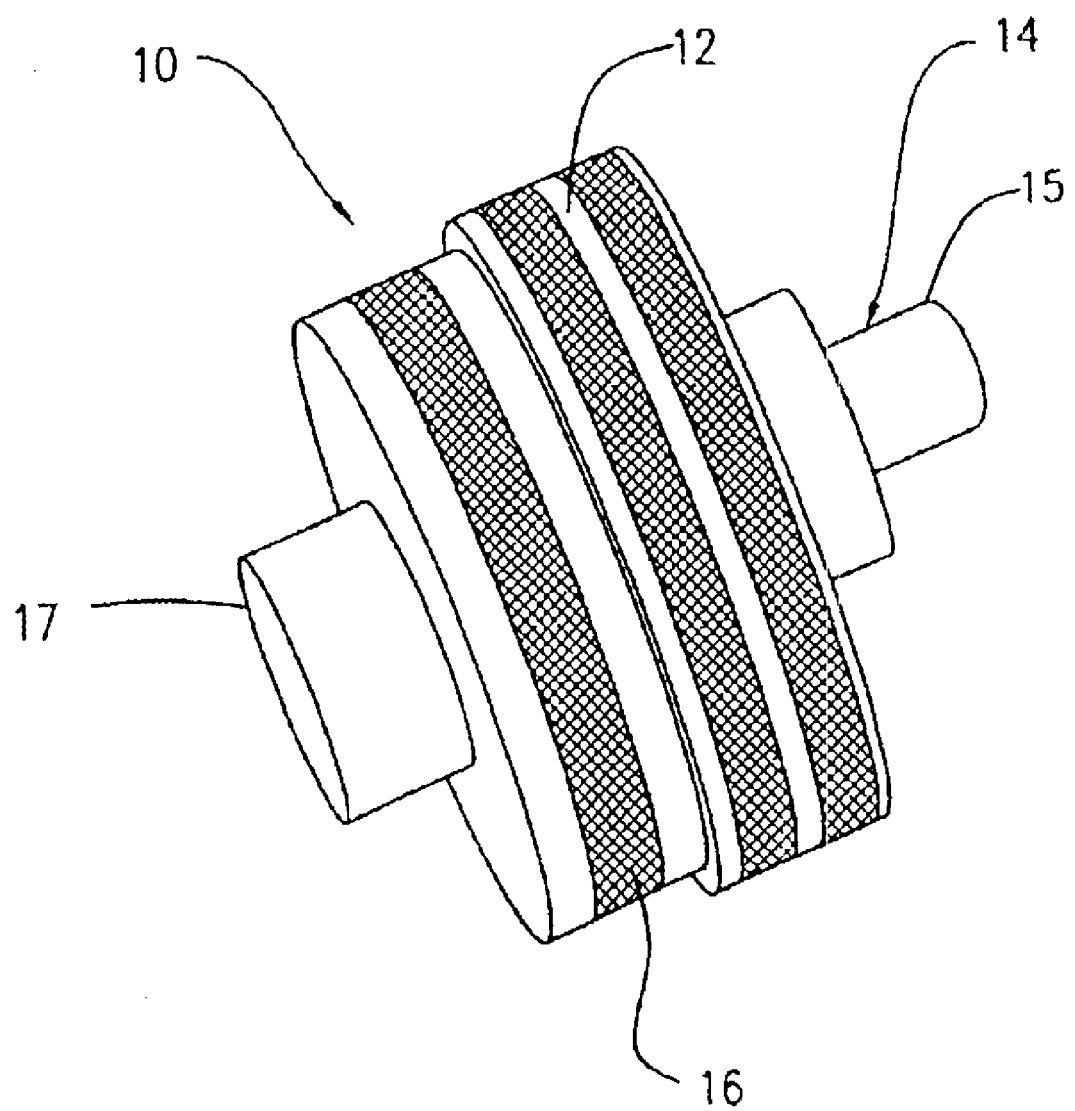
FIG. 1 is a pictorial side view, in elevation of a variable compression disc filter housing assembly, according to the principals of the present invention.

Referring now to the figures, and in particular to FIG. 1, wherein there is shown, a pictorial side view, in elevation of a variable compression disc filter housing assembly 10, preferably fabricated from stainless steel, which includes a compression ring 12 adapted to retain an inlet body portion 14 threaded onto an outlet body portion 16. The disc filter housing assembly 10 may be provided with internal or external threaded ends 15 and 17 suitable for connection to inline cooperating connections, not shown.

Figure 2:
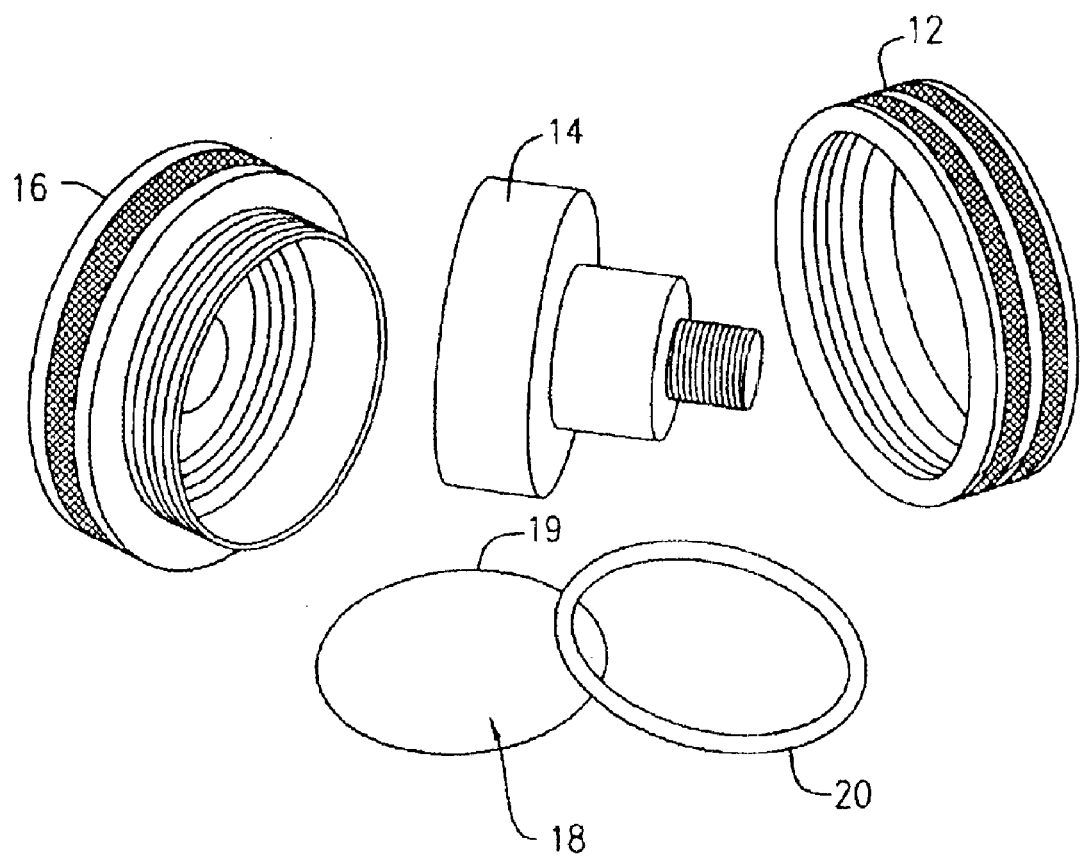
FIG. 2 is an exploded pictorial view of the several parts of the disc filter housing assembly including the laminated filter disc material utilized therein.
Figure 2A:
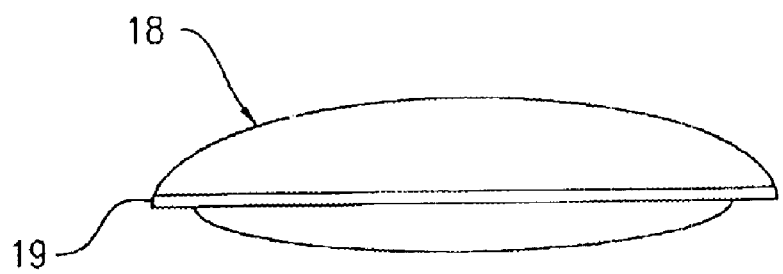
FIG. 2A is a side view in elevation of the disc filter material showing the circumferentially welded construction thereof and the direction of liquid flow therethrough.

Referring now to FIG. 2, which is an exploded view of the several parts of the filter housing assembly 10 that includes a filter disc 18, made from a plurality of filter materials that have been circumferentially welded to form a solid edge and a malleable compression ring 20, preferably made of Buna-N material.

Figure 3:
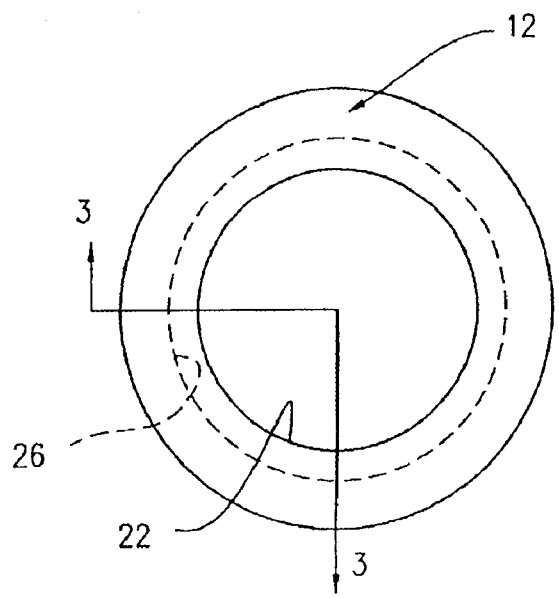
FIG. 3 is a top plan view of the compression ring portion of the filter housing assembly.
Figure 3A:
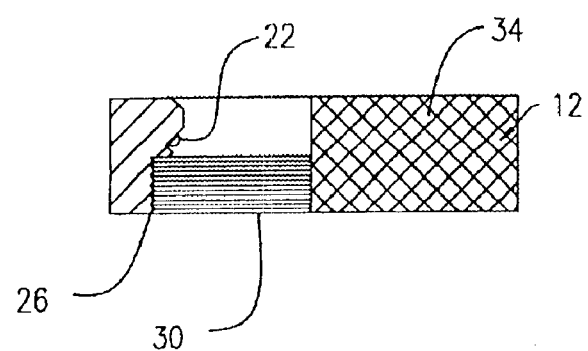
FIG. 3A is a cross-sectional view of the compression ring portion of the filter housing assembly taken along the line 1—1 of FIG. 3.
Figure 4:
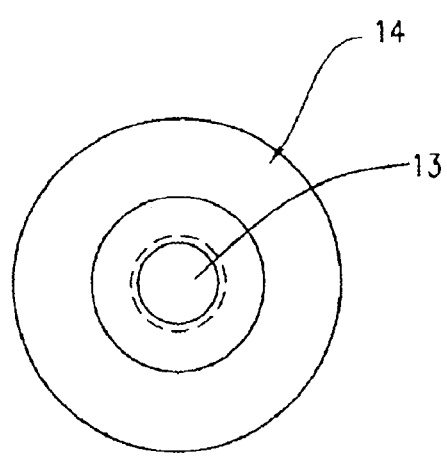
FIG. 4 is a top plan view of inlet body portion of the filter housing assembly.
Figure 4A:
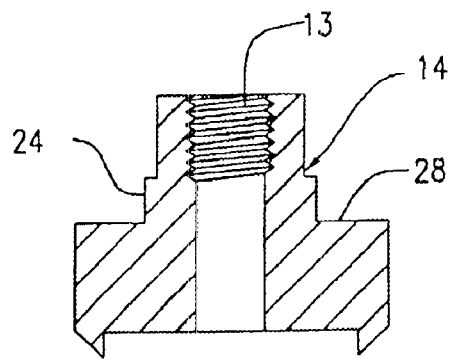
FIG. 4A is a cross-sectional view in elevation along the line 4—4 of FIG. 4 of the inlet body portion of the housing assembly shown in FIG. 4.

FIGS. 3 and 4 are a top plan views, respectively, of the compression ring 12 and the inlet body portion 14. FIGS. 3A and 4A, respectively, are a cross-section in elevation taken along line 3—3 of FIG. 3 and line 4—4 of FIG. 4, which shows the opening 22 adapted to receive the upwardly extending portion 24 of the inlet body portion 14 provided with the inlet port 13. The ledge 26 provided in the compression ring 12 applies pressure to the surface 28 provided on the inlet body portion 14 when the compression ring 12 is threaded onto cooperating threads 30 and 32 provided on the compression ring 12 and the outlet body portion 16, respectively. A knurled circumference is provided on the outer surface of compression ring 12 for ease in rotation when providing the required pressure.

Figure 5:
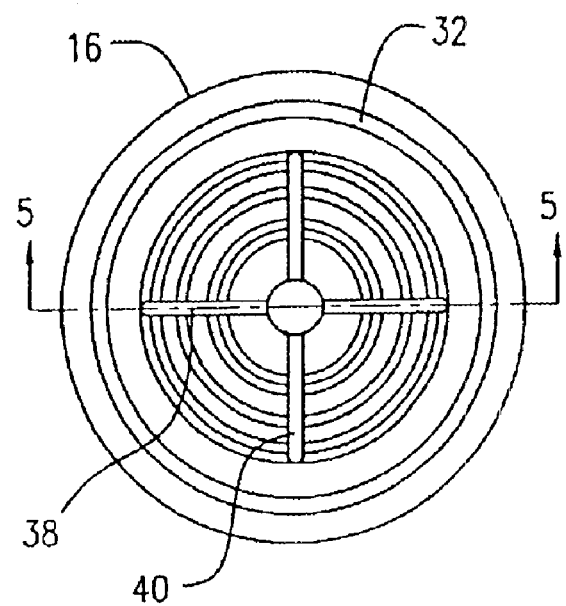
FIG. 5 is a top plan view of the outlet body portion of the disc filter housing assembly showing the ridges and channels disposed therein, upon which the filter disc material is disposed.
Figure 5A:
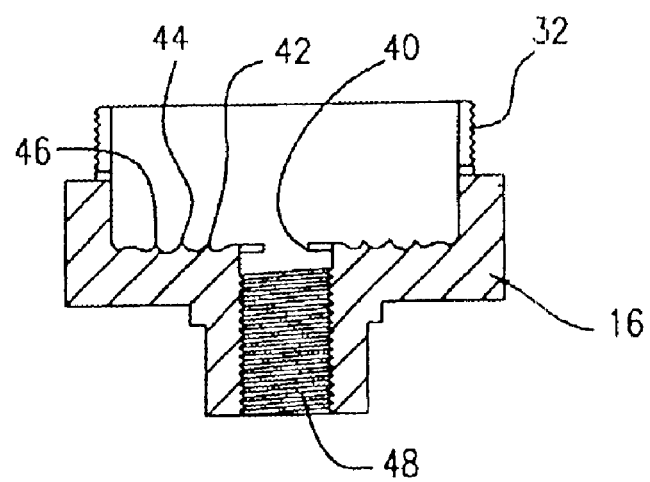
FIG. 5A is a cross-sectional view in elevation taken along the line 5—5 of FIG. 5.

FIG. 5 is top plan view of the inner surface 36 of the outlet body portion 16 and FIG. 5A is a cross-sectional view in elevation along the line 5—5 of FIG. 5, showing the location of slots 38 and 40 and the peaks 42, 44, and 46 that are provided to insure that the liquid flowing through the filter disc material may exit via the threaded aperture 48.

In operation, the filter housing assembly 10 is separated by unscrewing the compression ring 12 from the outlet body portion 16 and then removing the malleable compression ring 20 and the filter disc material 18 from the housing assembly 10. Connection is made from the upstream portion of the fluid to be evaluated to the inlet body portion 14. The upstream side of the filter disc material 18 is determined by placing the curved upward surface of the filter disc material 18 facing the inlet port 13. The compression ring 12 is placed over the filter disc material 18 and the compression ring 12, with the inlet port 13 disposed therein being threaded onto the outlet body portion 16 of the filter housing assembly 10. The outlet aperture 48 is then connected to the downstream fluid line. The compression ring 12 is sufficiently tightened to avoid any leaks therefrom. The pressure pump is then activated allowing the fluid to flow through the filter assembly 10 collecting the filtered liquid for evaluation after a fixed period of time. The filter housing 10 may then be disassembled and the filter disk material 18 removed and examined to determine the contaminate particles captured in the various layers of the composite filter material.

Hereinbefore has been disclosed an apparatus and method for improving the life and reliability of filter bags used in production pressurized filter systems. It will be understood that various changes in the method detail, materials, arrangements of parts and operating conditions, which have been herein described and illustrated in order to explain the nature of the invention may be made by those skilled in the art within the principles and scope of the instant invention.

Having thus set forth the nature of the invention, what is claimed is:

1. In a pressurized filter system for filtering liquids, wherein a sample of the liquid to be filtered is caused to flow through an inline filter apparatus having an inlet body portion and an outlet body portion with a filter disc disposed therebetween (to determine) for determining the optimum filter material to be utilized in a production filter system comprises:

A. a centrally located input port disposed in the inlet body portion of said filter apparatus;

B. a compression ring circumscribing said inlet body portion having internal threads and an aperture into which said inlet body portion is removably received;

C. an outlet body portion having a centrally disposed output port and external threads adapted to receive said internal threads provided on said compression ring;

D. filter disc material comprising several layers of filter material circumferentially welded together to form a rigid disc, said disc being adapted to be centrally received by said outlet portion; and E. an internal malleable compression ring disposed between said filter disc and said inlet body portion to provide uniform pressure about the circumference of said disc as said compression ring is rotated onto said outlet body portion.

2. A filter system according to claim 1, wherein said inlet body portion is provided with an extending internal lip portions adapted to come into contact with said filter disc circumferentially welded portion.

3. A filter system according to claim 1, wherein said outlet body portion is provided with a plurality of groves and slots on the inner surface thereof.

4. A sample filtering apparatus to determine the optimum filter material to be utilized in a production filter system comprises:

A. an inlet body portion having a centrally located input port wherein said inlet body portion is provided with an extending internal lip portion adapted to come into contact with a filter disc circumferentially welded portion;

B. a compression ring circumscribing said inlet body portion having internal threads and an aperture into which said inlet body portion is removably received;

C. an outlet body portion having a centrally disposed output port and external threads adapted to receive said internal threads provided on said compression ring and is provided with a plurality of grooves and slots on the inner surface thereof;

D. a filter disc consisting of several layers of filter material circumferentially welded together to form a rigid disc, said disc being adapted to be centrally received by said outlet body portion; and E. an internal malleable compression ring disposed between said filter disc and said inlet body portion for providing uniform pressure about the circumference of said disc as said compression ring is rotated onto said outlet body portion.

* * * * *

UNITED STATES PATENT AND TRADEMARK OFFICE
CERTIFICATE OF CORRECTION

PATENT NO. : 6,923,909 B2
DATED : August 2, 2005
INVENTOR(S) : Sidney Goldman

It is certified that error appears in the above-identified patent and that said Letters Patent is hereby corrected as shown below:

<u>Title page, Item [54] and Column 1, lines 1-2,</u>
Title, should read -- DISC FILTER HOUSING AND FILTER DISC THEREFOR --.

Signed and Sealed this

Twenty-seventh Day of December, 2005

JON W. DUDAS
*Director of the United States Patent and Trademark Office*